(12) United States Patent
Simon et al.

(10) Patent No.: US 11,341,654 B2
(45) Date of Patent: May 24, 2022

(54) CORRESPONDENCE SEARCH BETWEEN MATRIX ELEMENTS

(71) Applicant: Robert Bosch GmbH, Stuttgart (DE)

(72) Inventors: Stephan Simon, Sibbesse (DE); Arne Zender, Bad Salzdetfurth (DE)

(73) Assignee: Robert Bosch GmbH, Stuttgart (DE)

( * ) Notice: Subject to any disclaimer, the term of this patent is extended or adjusted under 35 U.S.C. 154(b) by 139 days.

(21) Appl. No.: 16/349,090

(22) PCT Filed: Oct. 30, 2017

(86) PCT No.: PCT/EP2017/077729
§ 371 (c)(1),
(2) Date: May 10, 2019

(87) PCT Pub. No.: WO2018/095698
PCT Pub. Date: May 31, 2018

(65) Prior Publication Data
US 2019/0279370 A1     Sep. 12, 2019

(30) Foreign Application Priority Data

Nov. 23, 2016 (DE) .......... 102016223079.4

(51) Int. Cl.
*G06K 9/00* (2022.01)
*G06T 7/20* (2017.01)
(Continued)

(52) U.S. Cl.
CPC ............... *G06T 7/20* (2013.01); *G06F 17/16* (2013.01); *G06T 7/269* (2017.01); *G06T 7/97* (2017.01);
(Continued)

(58) Field of Classification Search
CPC .......... G06K 9/6202; G06K 9/36; G06K 9/64; G06T 7/20; G06T 2207/20021;
(Continued)

(56) References Cited

U.S. PATENT DOCUMENTS 5,253,308 A * 10/1993 Johnson .................... G06T 1/20
                                                              382/304
5,526,506 A *  6/1996 Hyatt ...................... F21V 23/00
                                                              711/111
(Continued)

FOREIGN PATENT DOCUMENTS

DE          10351778 A1    6/2005
DE      11 2009 001 727 T5    6/2011
(Continued)

OTHER PUBLICATIONS

Torr et al., The Development and Comparison of Robust Methods for Estimating the Fundamental Matrix, 1997, International Journal of Computer Vision 24(3), pp. 271-300 (1997).*

(Continued)

*Primary Examiner* — Guillermo M Rivera-Martinez
(74) *Attorney, Agent, or Firm* — Norton Rose Fulbright US LLP; Gerard Messina

(57) ABSTRACT

A method for ascertaining/mapping between a matrix element (ME) and a comparison ME (CME) of a comparison matrix (CM), including writing the ME position in a table element (TE) of a correspondence table (CT) for a number of MEs, and following a predefined offset, reading out a TE, ascertaining the ME position stored in the TE until the read for the same number of MEs has been performed, establishing a mapping from the TE's read-out position and a CME's current position. The writing includes reading out a ME feature, ascertaining an access feature (AF) from the ME feature, ascertaining a TE of the CT from the AF, and writing the ME position in the ascertained TE. The reading includes (Continued)

reading out a CME feature, ascertaining an AF from the CME, ascertaining a TE of the CT from the AF, and reading out the ME's stored position from the ascertained TE.

25 Claims, 1 Drawing Sheet

(51) Int. Cl.
    *G06T 7/00*     (2017.01)
    *G06F 17/16*     (2006.01)
    *G06T 7/269*     (2017.01)

(52) U.S. Cl.
    CPC ............... *G06T 2207/10012* (2013.01); *G06T 2207/10016* (2013.01); *G06T 2207/30252* (2013.01)

(58) Field of Classification Search
    CPC ....... G06T 3/0093; G06T 7/248; G06T 7/337; G06T 7/32
    See application file for complete search history.

(56) References Cited

U.S. PATENT DOCUMENTS

| | | | | |
|---|---|---|---|---|
| 5,835,902 | A * | 11/1998 | Jannarone | G06N 3/063 706/26 |
| 6,381,360 | B1 * | 4/2002 | Sogawa | G06K 9/20 348/116 |
| 2006/0269155 | A1 * | 11/2006 | Tener | G06T 3/4038 382/243 |
| 2007/0121998 | A1 * | 5/2007 | Stein | G06K 9/4609 382/103 |
| 2011/0210851 | A1 * | 9/2011 | Woodfill | G06K 9/6211 340/540 |
| 2011/0293146 | A1 * | 12/2011 | Grycewicz | G06T 7/32 382/106 |
| 2013/0279596 | A1 * | 10/2013 | Gisquet | H04N 19/65 375/240.16 |
| 2014/0026111 | A1 * | 1/2014 | Stitt | G06F 17/17 717/101 |
| 2015/0139607 | A1 * | 5/2015 | Grunberg | H04N 5/217 386/230 |
| 2016/0092735 | A1 * | 3/2016 | Govil | G06K 9/605 382/103 |
| 2017/0099447 | A1 * | 4/2017 | Smith | H04N 5/347 |

FOREIGN PATENT DOCUMENTS

| | | |
|---|---|---|
| DE | 10 2013 224 502 A1 | 6/2014 |
| DE | 10 2014 009 522 A1 | 11/2014 |
| JP | 2007286942 A | 11/2007 |

OTHER PUBLICATIONS

International Search Report for PCT/EP2017/077729, dated Jan. 25, 2018.
Stein F., "Efficient Computation of Optical Flow Using the Census Transform", Electronic Publishing, Artistic Imaging, and Digital Typography, vol. 3175, 2004, pp. 79-86, XP002334021.
Elnagar A et al., "Motion Detection Using Background Constraints", Pattern Recognition, Elsevier, GB, vol. 28, No. 10, 1995, pp. 1537-1554, XP004002551.
Beauchemin S., et al. "The Computation of Optical Flow", ACM Computing Surveys (CSUR), vol. 27, No. 3, 1995, pp. 433-467.
Horihiko, Kaneko: "Heisei 28(2016) Database Specialist Success Textbook", 1st Edition, Incorporated Company Technical Hyoronsha, Nov. 15, 2015, pp. 523-526, ISBN: 978-4-7741-7708-3.
Tokunaga, Hiroyuki: "Technique for supporting the input of Web+ DB Press plus series", 1st edition, Technical Knowledge Corporation, Mar. 5, 2012, pp. 77 to 85, ISBN : 978 to 4, and 7741 to 4993, and 6.
JPO Office action issued in counterpart Japanese patent application No. 2009-547765 dated Sep. 3, 2020.

* cited by examiner

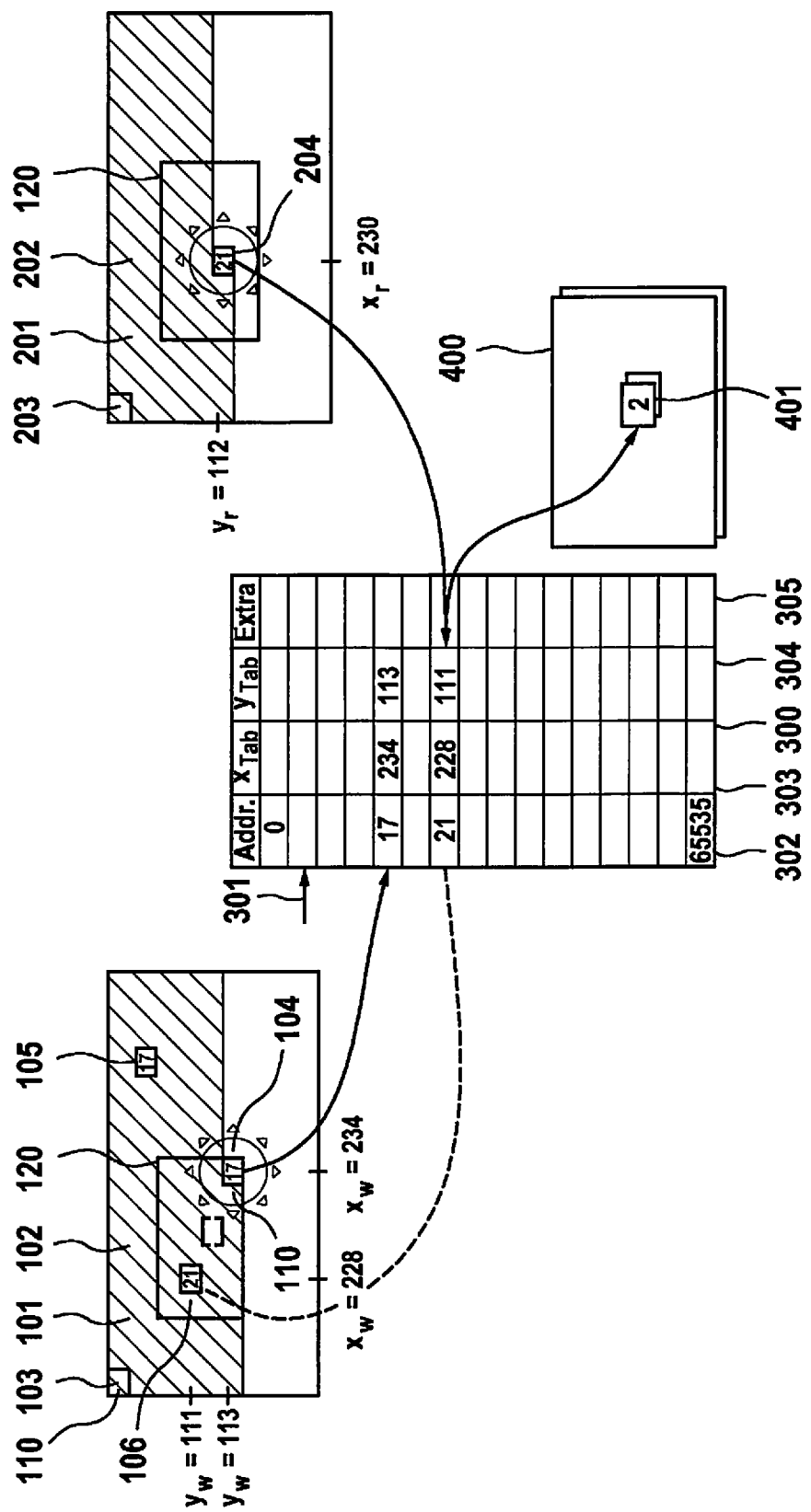

CORRESPONDENCE SEARCH BETWEEN MATRIX ELEMENTS

FIELD OF THE INVENTION

The present invention relates to a method for ascertaining mappings between a matrix element of a matrix and a comparison matrix element of a comparison matrix, and it relates to a corresponding device.

BACKGROUND INFORMATION

In camera-based systems, in particular, comparisons of elements of two matrices are carried out and mappings are established between the elements. For example, the matrix and the comparison matrix may represent a respective first and second image. The formation of a mapping or of correspondences is employed in the area of computer vision, in particular in connection with an optical flow or a stereo disparity. In an optical flow, correspondences in the temporal direction are formed in order to ascertain to what extent the projection of a point in a 3D scene into a 2D image has moved from an old coordinate to a new coordinate. The movement in the image may be caused by the movement of the scene point or by the movement of a camera, or by both at the same time.

In stereo vision, different images and correspondences between individual image points are used in order to detect concurrent images from two cameras that are located at different positions. As a rule, the relative placement of the cameras is known and stationary. Through a correspondence formation, it is then possible to ascertain a distance to a point in the 3D scene. From the printed publications DE 11 2009 001 727 B4, DE 10 2014 009 522 A1, and DE 10 2013 224 502 A1, methods are discussed for image processing and for calculating correspondences, in which a correspondence is formed of image points in different images. While the two first printed publications are directed to an optical flow, the printed publication cited last relates to images of a stereo camera.

SUMMARY OF THE INVENTION

The method according to the present invention for ascertaining a mapping between a matrix element of a matrix and a comparison matrix element of a comparison matrix includes a first step, which provides for the execution of a write process for writing the position of a matrix element of the matrix in a table element of a correspondence table. The write process is performed for a plurality of matrix elements of the matrix. In a further step, a read process is carried out following a predefined offset, in which a table element of the correspondence table is read out and a position of a matrix element of the matrix is ascertained that is stored in the table element. A further step provides for the establishment of a mapping based on the read-out position from the table element and a current position of a comparison matrix element of a comparison matrix. The write process includes the steps of ascertaining a feature of a matrix element of the matrix, ascertaining an access feature from the matrix element, ascertaining a table element of the correspondence table from the access feature, and writing the position of the current matrix element of the matrix in the ascertained table element. The read process for reading out the table element includes the steps of reading out a feature of a comparison matrix element of a comparison matrix, and ascertaining an access feature from the comparison matrix element. In addition, the read process includes ascertaining a table element of the correspondence table from the access feature of the comparison matrix element and reading out the stored position of the matrix element from the ascertained table element. The readout of a feature of a comparison matrix element of a comparison matrix, and thus the read process, thus may begin only when a plurality of matrix elements of the matrix has been processed, i.e. the position has been written in the table, for example.

A very simple and extremely efficient correspondence formation is carried out in this manner.

It is understood by one skilled in the art that the ascertaining of the feature of a matrix element of the matrix by a readout or during processing or in the course of the present method may be carried out in a time-controlled manner, as what is known as an "on the fly" method. The time-dependent ascertainment may take place during the image processing. The feature may be formed only right when it is needed or a short time prior to being needed (then including an intermediate storage), for instance when it is ascertained from the environment of a pixel or when it describes the local environment around a pixel or around an image point. The matrix need not be fully populated but may have empty slots or exist only partially. For example, a partially populated matrix may exist when the matrix elements represent an image point or a pixel.

The present invention is able to be applied not only to the processing of image data and images in the form of matrices, but also constitutes a universal tool that allows for the efficient establishment of correspondences of many types. For example, letter sequences in texts may be identified and corresponding correspondences are able to be ascertained. The employed matrices are not restricted to Cartesian matrices but also include other matrix forms such as hexagonal matrices.

The dependent claims indicate further developments of the present invention.

It is advantageous if, in a further step, a result matrix is formed from the established mappings between matrix elements and comparison matrix elements. This makes for easy further processing of the mappings or correspondences.

It is also advantageous if the position of the matrix element and the comparison matrix element is indicated by coordinates. In this way, a unique position of the corresponding elements is able to be specified. The coordinates are able to be stored individually or in the form of vectors; in the case of two-dimensional matrices and images, the position may be indicated in X-coordinates and Y-coordinates. Hexagonal matrices are conceivable.

It is also advantageous if the first matrix is a first image and the comparison matrix is a second image. In an advantageous manner, a matrix element is an image point or a pixel in the first image, while a comparison matrix element is an image point or a pixel in the second image. The first image may be shifted in time relative to the second image, or the first image may represent an image of a first camera and the second image an image of a second camera at the same point in time. In this way, it is possible to identify movements of image points or to calculate distances to image points in a 3D scene using a stereo evaluation.

When processing images, it is advantageous to use the mapping as the optical flow. Movements between the images are ascertained in the process.

It is also advantageous if a feature describes the environment around a matrix element or around a comparison matrix element. Thus, the feature represents the local environment of an image coordinate or a pixel of an image or the local environment around an element of a matrix. Typically, a disk-shaped or rectangular environment around an image coordinate is used, and the feature is able to be formed from gray values or color values, for instance. Ideally, the feature is constructed in such a way that an environment having a similar appearance leads to an identical feature in all matrices, i.e. in the case of image processing, a similar environment around an image coordinate leads to identical features. Methods for generating features are well known to one skilled in the art.

It is also advantageous to form an access feature from the feature of a matrix element or from the feature of a comparison element. In the simplest case, the feature and the access feature are identical. To determine the access feature, it is possible to use the entire feature of a matrix element (image point), a portion of this feature, or features of a plurality of matrix elements or comparison matrix elements. It may be advantageous if the value range of the feature corresponds to the size of the table. In such a case, the feature may be used directly as an access feature and indicate the address of the corresponding table element of the correspondence table. Thus, given a word width of 16 bits of a feature, the value range of 0 to $2^{16}-1$ is directly comparable to a correspondence table having a length of 65,536.

The access feature is able to describe the address of a table element of the correspondence table. If the value range of the feature is greater than the table size or its length, i.e. the number of table elements, then several options are available. For example, only a small part of the feature is able to be used as a table address. The remaining part is either discarded or utilized as supplementary information, which, for instance, is able to be stored in the correspondence table in the form of an attribute. It is also possible to image an excessively large feature via a function to a feature having a shorter length, which may cause the image to be lossy.

If the feature has a value range that is too small, then it is unclear what would lead to an unambiguous correspondence formation. For this reason, multiple features having a "short" word length of adjacent matrix elements—or in the case of images of adjacent image points—or of more remote ones, may be able to be linked to form a feature having a greater word length (concatenate).

The number of table elements, i.e. the length of the correspondence table, may of course be smaller, or considerably smaller, than the number of features in the matrix for which the mappings or correspondences are to be determined. The access features are then not unique because an access feature normally occurs multiple times in the same image.

In an advantageous manner, at least one invalid access feature is provided, i.e. one that is not meant to be used for forming the mapping or correspondence. This advantageously makes it possible to mark particular positions in the matrix or in the image for which no mapping is desired or for which it is foreseeable that a mapping will be unsuccessful. In the case of images, this may be completely white areas in which an image sensor has not achieved its saturation. Additional examples are areas in which no significant texture is present which distinguishes it from the noise of the sensor, or areas which were marked as irrelevant, e.g., the (irrelevant) area of the engine hood that was recorded by a camera mounted behind the windshield.

It is advantageous if a table element of the correspondence table includes further attributes in addition to the position of a matrix element. This additional information, for instance, may help in ascertaining ambiguities in the formation of the mapping, and in establishing preferred mappings or preferred correspondences. It is also possible to utilize this supplementary information in case of excessively large value ranges of the features or to carry certain attributes from one matrix to another or from one image to the other via the formed mappings. In the case of images, for example, this could be a measured size or an object distance or a determined classification of a matrix element or an image point.

The processing of the matrix and the comparison matrix advantageously takes place sequentially. Thus, the individual matrix elements are processed one after the other. For example, line-by-line processing of the matrix elements is able to be undertaken, i.e. the write process and/or the read process is/are first applied to the first matrix element of a first line and then to an adjacent element. The (sequential) processing may be carried out across a predefined number of matrix elements, which may be across all matrix elements of the matrix. The number of write processes and read processes may be the same.

It is advantageous if the offset between the write process and the read process is fixed or variable. The offset is advantageously selected in such a way that the read process follows the write process; however, a reversal of this principle is possible. A fixed offset offers the advantage that it is possible to specify as a correspondence or mapping the greatest difference that is to be found. A variable offset offers the advantage that the search range defined by the offset is variable as well, thereby making it possible, for example, to take special features of the image processing into account. For instance, the optical flow vectors used as mapping in camera systems, i.e. the mapping vectors, become greater in length the farther below a point in an image is located. Due to the variable offset, this special feature is easily able to be taken into account; it may be necessary to adapt the write processes and read processes, as the case may be. For example, it may be advantageous to suspend one of the processes for a certain period of time when the offset is variable.

It is also advantageous to provide a search field in the matrix. The search field includes a plurality of matrix elements that have already been processed by the write process, e.g., that were already entered in the table. It may advantageously also include the current matrix element of the write process, i.e. the most recently written matrix element. A mapping of matrix elements and comparison elements is carried out only for the particular matrix elements that are located within the search field. This makes it possible to restrict the search area for mappings between the matrix and the comparison matrix, for instance in an effort to avoid ambiguities. The search field may not only have a rectangular or square form but other forms as well, such as a circle, an ellipsis, a polygon or a similar shape.

It is also advantageous if the mapping is a vector. The mapping vector may be calculated from the position read out from the table element and the position of the current comparison matrix element. In an especially particular manner, the calculation may use the difference. The mapping vector may be understood as a movement vector or an optical flow vector in image processing methods. It is easily further processed.

Moreover, it is advantageous to carry out a reset of the correspondence table and to delete or overwrite existing values. The reset may be carried out as a one-time reset (initialization), such as for the entire correspondence table. It may take place prior to the write process. Alternatively, the reset may be carried out as a continual process that is able to be performed in parallel with the write process or the read process, i.e. each stored position may be processed multiple times per image cycle and deleted, as the case may be. This results in the "throughput" of the reset function. A continual reset of the correspondence table may be carried out at least twice per image throughput because normally there are table entries that must not be deleted yet because they may still lead to correspondences. These "remainders" may be deleted during a later, time-offset throughput. Old values in the table elements that are no longer suitable for a correspondence formation are thereby discarded or deleted.

The offset for the time-offset throughput is advantageously selected in such a way that it corresponds to maximally one half of an image height or matrix height. During the continual reset, for example, all positions stored in the table are processed in a fixed sequence (e.g., ascending address) (and deleted, as the case may be). Once all addresses have been processed, it is started again from the beginning using the same sequence. At least two of such reset throughputs take place per image throughput (or sub-matrix throughput), it being possible to continue the throughputs of the reset regardless of an image change.

When a search field is present, an overwriting takes place of the particular values inside the table that are already so old they are no longer used for the mapping formation or the correspondence formation because they lie outside the search range, meaning that the read process has already processed the corresponding matrix elements. It is also advantageous to carry out two appropriately time-offset reset throughputs per image pair or matrix pair in order to ensure correct and complete processing in the continual reset mode and to make sure that old entries in the correspondence table are deleted in a timely manner before an erroneous correspondence formation or mapping formation can occur during the processing of the next matrix pair.

The device for ascertaining a mapping between a matrix element of a matrix and a comparison matrix element of a comparison matrix, which is set up to execute the method according to the present invention, is advantageous and offers all of the advantages of the method according to the present invention.

In the following text, exemplary embodiments of the present invention are described in detail with reference to the appended drawing.

BRIEF DESCRIPTION OF THE DRAWING

The FIGURE shows a schematic illustration for a correspondence formation using a first image and a second image.

DETAILED DESCRIPTION

The FIGURE shows a matrix 101, which is a first image 102. Shown next to it is a comparison matrix 201, which is a second image 202. First image 102 and second image 202 correspond to a recording at different points in time. First matrix 101 includes a multitude of matrix elements 103. Comparison matrix 201 has a multitude of comparison matrix elements 203.

The FIGURE shows an instantaneous recording in which first image 102, second image 202 and a correspondence table 300 are shown, as well as a result matrix 400 in which mappings are able to be stored. Matrix elements 103, 203 include respective features which correspond to access features 110 in the simplified form shown here. The access features may be encoded as a number and indicate the address of a table element 301. In this case, table element 301 corresponds to a line in table 300. Table 300 illustrated here has four columns 302 to 305, and column 302 indicates the addresses of the table element. This column 302 is usually only implicitly present and does not exist explicitly. As a rule, it does not require a memory slot and is mentioned here merely for reasons of comprehensibility. Columns 303 and 304 describe the positions, column 303 reflecting the X-values and column 304 the Y-values of the coordinates or the position of the matrix elements or image points. Column 305 allows the storing of additional attributes within correspondence table 300.

In the FIGURE, the write process in image 102 according to the method of the present invention has already progressed. The write process has processed a portion of matrix elements 103 and has currently reached matrix element 104. Processed matrix elements 103 are shown in hatched form in the FIGURE. Matrix element 104 has access feature 110, which is the number 17 in this instance, which is address 17. The write process thus writes the coordinate or position of matrix element 104 in the seventeenth table line 301 of the correspondence table, so that the X-coordinate and the Y-coordinate are entered in respective columns 303 and 304 at the corresponding location, in this instance, the X-position 234 and the Y-position 113.

The comparison of images 102 and 202 shows that the read process carried out in image 202 follows the write process performed in image 102. The offset between the write process in image 102 and the read process in image 202 amounts to one line and a plurality of columns, but this has been chosen merely for illustration purposes. When processing full-HD images, the offset may be selected to be considerably greater, such as 32 lines and 64 image columns. The writing process runs ahead of the reading process by this offset.

The processing of the correspondence formation or mapping formation, in which identical access features 110 in matrix 101 and comparison matrix 201 are linked to one another, which may take place sequentially, e.g., line by line, such as starting with the upper left matrix element 103. The processing may also be carried out column by column or in some other sequence. An identical sequence may be selected both in image 102 and in image 202, but it is not started at the same time but at an offset, which may be considered a temporal offset or a local offset.

Due to the temporally offset processing of the read process versus the write process, a phase initially occurs during which only writing takes place while the read process has not yet started. This is followed by a phase during which both processes are operating. After final matrix element 103 in matrix 101 has been reached, the write process stops while the read process in comparison matrix 201 is still ongoing.

It may be gathered from the FIGURE that at the current position, the write process is at present writing matrix element 104 in the correspondence table. Prior to that, a further matrix element 105 having access feature 110, which also has the value "17", was already written in the 17th line of the correspondence table. Existing entries such as the position or possibly supplementary information are overwritten during the current write process. In the course of the write process, an access feature 110 having the value "21" was also already written in line 301 of correspondence table 300 with address "21" for an exemplary matrix element 106.

The temporally offset read process, which reads out current comparison matrix element 204, ascertains an access feature 110 having the value "21" for this element 204. According to the method of the present invention, the coordinate values from columns 303 and 304 are now read out in the 21$^{st}$ line of correspondence table 300. The table element refers to matrix element 106 having the same access feature with the value "21". Now, a mapping is formed between comparison matrix element 204 and matrix element 106, the coordinates of the two elements 106, 204 being compared to one another. In an advantageous manner, a difference is formed. The reading process reads out from correspondence table 300 at address 21 the position of matrix feature 106 with $x_{tab}$=228, $y_{tab}$=111, which had previously been entered there by the writing process when the writing process was located at matrix element 106. According to the method of the present invention, the difference between the position of the current comparison matrix element 204 and the read-out position of matrix element 106 is advantageously formed, the mapping then obtaining the value $$u = x_r - x_{tab} = 230 - 228 = 2$$

$$v = y_r - y_{tab} = 112 - 111 = 1,$$

where $x_r$, $y_r$ denotes the current position of comparison matrix element 204. In a further step of the present method, it is now checked whether the result of the read-out process, i.e. the position of matrix element 106, lies within a search field 120. In the present case, this is true so that the ascertained mapping u, v, which is present in the form of a mapping vector, is entered into result matrix 400. Search field 120 always relates to image 102 of the writing process or to matrix 101. For reasons of clarity, this is shown once again in comparison matrix 201 and in second image 202.

Search field 120 may be selected at such a size that it includes only matrix elements 103 that were already processed by the write process, that is to say, for which the position was written in the table, and that are now able to be read out by the read-out process. It must therefore lie in the hatched region of matrix 101. The FIGURE illustrates the case in which the lead is just large enough to satisfy the above criterion. The position of matrix element 104 currently being processed in the write process lies just within search field 120. In the illustrated sequential line by line processing from left to right, matrix element 104 currently to be processed by the write process thus is located in the right lower corner of search field 120. The lead could also be greater so that currently processed matrix element 104 lies to the right of search field 120, for instance, or in the next line.

It is possible that search field 120 is nonsymmetrical with respect to comparison matrix element 204, which is true in this case. It would also be possible for the current reference position, i.e. the currently processed comparison matrix element 204, to lie outside the search field. However, it is important that the write process has advanced to such an extent that the positions of matrix elements 103, which are located in search field 120, have already been noted and written in correspondence table 300 before the read process accesses the correspondence table. For this reason, search field 120 must always lie fully within the region of matrix 101 that is shown in hatched form here, in which the already processed matrix elements 103 are located.

What is claimed is:

1. A method for ascertaining a mapping between a matrix element of a matrix and a comparison matrix element of a comparison matrix, the method comprising:

performing a write process for writing a position of the matrix element of the matrix in a table element of a correspondence table for a plurality of matrix elements of the matrix;
performing, following a predefined offset, a read process for reading out the table element and ascertaining the position, stored in the table element, of the matrix element of the matrix;
establishing a mapping from the position of the table element and a current position of the comparison matrix element of the comparison matrix;
wherein the write process includes:
  ascertaining a feature of the matrix element of the matrix,
  ascertaining an access feature from the matrix feature,
  ascertaining the table element of the correspondence table from the access feature,
  writing the position of the matrix element of the matrix in the ascertained table element; and
wherein the read process includes:
  reading out a feature of the comparison matrix element of the comparison matrix,
  ascertaining an access feature from the comparison matrix element,
  ascertaining the table element of the correspondence table from the access feature of the comparison matrix element, and
  reading out the stored position of the matrix element of the matrix from the ascertained table element.

2. The method of claim 1, further comprising:
forming a result matrix from the established mappings between the matrix element of the matrix and the comparison matrix element of the comparison matrix.

3. The method of claim 1, wherein the position of the matrix element and the comparison matrix element is indicated by coordinates.

4. The method of claim 1, wherein the first matrix is a first image and the comparison matrix is a second image, and a matrix element is an image point in the first image and a comparison matrix element is an image point in the second image.

5. The method of claim 4, wherein the mapping is an optical flow.

6. The method of claim 1, wherein a feature describes the environment around a matrix element or around a comparison matrix element.

7. The method of claim 1, wherein the access feature is formed from the feature of a matrix element or a comparison matrix element, and in order to determine the access feature, the entire feature, a portion of the feature or features of a plurality of matrix elements or comparison matrix elements is/are used, depending on how large the feature is in comparison with the size of the correspondence table.

8. The method of claim 1, wherein a table element of the correspondence table includes additional attributes.

9. The method of claim 1, wherein sequential processing of the matrix and the comparison matrix is performed.

10. The method of claim 1, wherein the offset is fixed or variable.

11. The method of claim 1, wherein the offset is selected so that the read process follows the write process and the write process has already processed the particular matrix elements that are meant to be locatable for the read process.

12. The method of claim 1, wherein a search field is provided in the matrix, which includes a plurality of already processed matrix elements, and mapping of matrix elements and comparison matrix elements takes place only for matrix elements within the search field.

13. The method of claim 1, wherein the mapping is a vector.

14. The method of claim 1, wherein a reset of the correspondence table is performed, and a one-time reset of the entire correspondence table or a continual reset of the correspondence table takes place.

15. An ascertaining device configured to ascertain a mapping between a matrix element of a matrix and a comparison matrix element of a comparison matrix, comprising:
performing, by a processor of the ascertaining device, a write process for writing a position of the matrix element of the matrix in a table element of a correspondence table for a plurality of matrix elements of the matrix;
performing, following a predefined offset, a read process for reading out the table element and ascertaining the position, stored in the table element, of the matrix element of the matrix;
establishing a mapping from the position of the table element and a current position of the comparison matrix element of the comparison matrix;
wherein the write process includes:
ascertaining a feature of the matrix element of the matrix,
ascertaining an access feature from the matrix feature,
ascertaining the table element of the correspondence table from the access feature,
writing the position of the matrix element of the matrix in the ascertained table element; and
wherein the read process includes:
reading out a feature of the comparison matrix element of the comparison matrix,
ascertaining an access feature from the comparison matrix element,
ascertaining the table element of the correspondence table from the access feature of the comparison matrix element, and
reading out the stored position of the matrix element of the matrix from the ascertained table element.

16. The method of claim 1, wherein the mapping is a vector, which is calculated from a difference between the position read out from the table element and the position of the current comparison matrix element.

17. A method for ascertaining a mapping between a matrix element of a matrix and a comparison matrix element of a comparison matrix, a first matrix being a first image and the comparison matrix being a second image and the matrix element being an image point in the first image and the comparison matrix element being an image point in the second image, the mapping being an optical flow or a stereo disparity, the method comprising:
performing a write process for writing a position of the matrix element of the matrix in a table element of a correspondence table for a plurality of matrix elements of the matrix;
performing, following a predefined local offset, a read process for reading out the table element and ascertaining the position, stored in the table element, of the matrix element of the matrix;
establishing a mapping from the read-out position of the table element and a current position of the comparison matrix element of the comparison matrix;
wherein the write process includes:
ascertaining a matrix feature of the matrix element of the matrix;
ascertaining an access feature from the matrix feature, the access feature formed from the matrix feature of the matrix element or the comparison matrix element, wherein to determine the access feature, one of the following is used depending on a relative size of the matrix feature as compared to a size of the correspondence table entire matrix feature: a portion of the matrix feature, matrix features of a plurality of matrix elements, or the comparison matrix elements;
ascertaining the table element of the correspondence table from the access feature, wherein the access feature describes an address of the table element of the correspondence table,
writing the position of the matrix element of the matrix in the ascertained table element; and
wherein the read process includes:
reading out a matrix feature of the comparison matrix element of the comparison matrix,
ascertaining an access feature from the comparison matrix element,
ascertaining the table element of the correspondence table from the access feature of the comparison matrix element, and
reading out the stored position of the matrix element from the ascertained table element,
wherein the matrix feature describes the environment around the matrix element or around the comparison matrix element,
wherein a search field is provided in the matrix, which includes a plurality of already processed matrix elements, and mapping of matrix elements and comparison matrix elements takes place only for matrix elements within the search field.

18. The method of claim 17, further comprising:
forming a result matrix from the established mappings between the matrix elements and the comparison matrix elements.

19. The method of claim 17, wherein the position of the matrix element and the comparison matrix element is indicated by coordinates.

20. The method of claim 17, wherein a table element of the correspondence table includes additional attributes.

21. The method of claim 17, wherein sequential processing of the matrix and the comparison matrix is performed.

22. The method of claim 17, wherein the offset is fixed or variable.

23. The method of claim 17, wherein the offset is selected so that the read process follows the write process and the write process has already processed the particular matrix elements that are meant to be locatable for the read process.

24. The method of claim 17, wherein the mapping is a vector, which is calculated from a difference between the position read out from the table element and the position of the current comparison matrix element.

25. The method of claim 17, wherein a reset of the correspondence table is performed, and a one-time reset of the entire correspondence table or a continual reset of the correspondence table takes place.

* * * * *